(12) United States Patent
Takayanagi (10) Patent No.: US 8,887,868 B2
(45) Date of Patent: Nov. 18, 2014

(54) STARTING METHOD FOR ROTATING MACHINE AND STARTING METHOD FOR WIND TURBINE GENERATOR

(75) Inventor: Kazufumi Takayanagi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/846,216

(22) Filed: Jul. 29, 2010

(65) Prior Publication Data

US 2011/0204633 A1    Aug. 25, 2011

Related U.S. Application Data

(63) Continuation of application No. PCT/JP2010/052534, filed on Feb. 19, 2010.

(51) Int. Cl.
| F16N 1/00 | (2006.01) |
|---|---|
| F16C 17/00 | (2006.01) |
| F16C 21/00 | (2006.01) |
| F16C 43/00 | (2006.01) |
| F01M 5/00 | (2006.01) |
| F03D 7/02 | (2006.01) |
| F03D 11/00 | (2006.01) |
| F16N 29/02 | (2006.01) |
| F16N 39/04 | (2006.01) |

(52) U.S. Cl.
CPC ............ *F16N 29/02* (2013.01); *F61N 39/02* (2013.01); *Y02E 10/722* (2013.01); *F03D 7/026* (2013.01); *F05B 2260/20* (2013.01); *F16N 2270/20* (2013.01); *F03D 11/0008* (2013.01); *F61N 2270/56* (2013.01); *Y02E 10/726* (2013.01); *Y02E 10/723* (2013.01); *F16N 2210/14* (2013.01); *F16N 2250/08* (2013.01); *F16N 39/04* (2013.01); *F16N 2210/025* (2013.01)

USPC .................................. 184/4; 184/6.22; 184/5

(58) Field of Classification Search
CPC   F61N 2210/025; F61N 2250/08; F61N 39/02
USPC ............................. 184/6.22, 4, 5; 290/44, 55
See application file for complete search history.

(56) References Cited

U.S. PATENT DOCUMENTS

| 3,712,766 | A | * | 1/1973 | Jones ............................. 418/88 |
| 3,895,689 | A | * | 7/1975 | Swearingen ................. 184/6.4 |

(Continued)

FOREIGN PATENT DOCUMENTS

| CN | 101158372 A | 4/2008 |
| CN | 101182901 A | 5/2008 |

(Continued)

OTHER PUBLICATIONS

Canadian Intellectual Property Office, "Notice of Allowance for CA 2,708,906", Apr. 4, 2013.

(Continued)

*Primary Examiner* — Henry Liu
(74) *Attorney, Agent, or Firm* — Manabu Kanesaka; Benjamin Hauptman; Kenneth Barner (57) ABSTRACT

A starting method is provided for a rotating machine which includes a main shaft, a main bearing rotatably supporting the main shaft and a main bearing lubricant pump circulating lubricant through the main bearing. The starting method includes steps of: rotating the main shaft to raise a temperature of the main bearing in a state in which the main bearing lubricant pump is not operated; and operating the main bearing lubricant pump to start supplying the lubricant to the main bearing after the step of raising the temperature of the main bearing.

11 Claims, 5 Drawing Sheets

(56) References Cited

U.S. PATENT DOCUMENTS

| | | | | |
|---|---|---|---|---|
| 4,441,872 | A | * | 4/1984 | Seale .................... 417/282 |
| 4,648,815 | A | * | 3/1987 | Williams .................... 418/84 |
| 5,275,258 | A | * | 1/1994 | Bousseau .................... 184/6.4 |
| 7,997,385 | B2 | | 8/2011 | Yanohara |
| 8,302,737 | B2 | | 11/2012 | Yanohara et al. |
| 2005/0034925 | A1 | * | 2/2005 | Flamang et al. .............. 184/6.12 |
| 2009/0001723 | A1 | * | 1/2009 | Nitzpon et al. ................. 290/44 |
| 2009/0191060 | A1 | | 7/2009 | Bagepalli et al. |
| 2010/0286878 | A1 | | 11/2010 | Lindgren |
| 2011/0012353 | A1 | | 1/2011 | Kamata et al. |

FOREIGN PATENT DOCUMENTS

| | | |
|---|---|---|
| CN | 101652585 A | 2/2010 |
| JP | S51-55103 U | 10/1974 |
| JP | S50-135452 A | 10/1975 |
| JP | 52 015644 U | 2/1977 |
| JP | 55 076290 A | 6/1980 |
| JP | 60 091022 A | 5/1985 |
| JP | 63 185996 U | 11/1988 |
| JP | H10-184314 A | 7/1998 |
| JP | 2007-146811 A | 6/2007 |
| JP | 2009-103159 A | 5/2009 |
| JP | 2009-185640 | 8/2009 |
| WO | WO2008/142947 | 11/2008 |
| WO | WO2009/142947 | 11/2008 |
| WO | WO2010/001479 | 1/2010 |
| WO | WO2010/018630 | 2/2010 |

OTHER PUBLICATIONS

Japan Patent Office, "Decision to Grant a Patent for JP 2010-532349", May 9, 2013.
IP Australia, Notice of Acceptance, May 10, 2012.
Korean Intellectual Property Office, "Notice of Allowance for KR 10-2010-7019391", Feb. 26, 2013.
Japan Patent Office, "Office Action for JP 2010-532349", Oct. 1, 2012.
China Patent Office, "Office Action for CN 201080001177.3," Mar. 31, 2014.

* cited by examiner

| | BEGINNING OF START SEQUENCE | | | |
|---|---|---|---|---|
| | HALT | HEAT LUBRICANT IN FREE ROTATION STATE | NO LOAD 1~5rpm | STANDBY STATE (READY TO NORMAL OPERATION) |
| | | WARM-UP OPERATION | | |
| PITCH CONTROL | ROTOR IS FREELY ROTATABLE / FEATHERING | | PITCH CONTROL ON | |
| HYDRAULIC PUMP | OFF | | ON | |
| SPEED-UP BEAR LUBRICANT PUMP | OFF | | ON | |
| MAIN BEARING LUBRICANT PUMP | OFF | | | ON |
| IN-ACCESSORY HEATER | OFF | ON (HEATING / KEEP WARM) | | |

STARTING METHOD FOR ROTATING MACHINE AND STARTING METHOD FOR WIND TURBINE GENERATOR

RELATED APPLICATIONS

The present application is a continuation Application of PCT/JP2010/052543 filed on Feb. 19, 2010, and the disclosure of which is hereby incorporated by reference herein in its entirety.

BACKGROUND OF THE INVENTION

1. Field of the Invention

The present invention relates to a method of starting a rotating machine, and more particularly, to a method of starting a rotating machine, such as a wind turbine generator, disposed in a cold environment.

2. Description of the Related Art

Wind turbine generators are increasingly constructed across the globe in favor of promotion of use of renewable energy. It is therefore demanded to construct wind turbine generators even in a cold environment.

One of issues necessary to be considered in constructing a wind turbine generator in a cold environment is that lubricant of a lubrication system is cooled when the wind turbine generator stops operating. When the lubricant is cooled after the wind turbine generator stops operating, the viscosity of the lubricant is increased, causing deterioration of the circularity of the lubricant. When the viscosity of the lubricant is excessively increased, load is imposed on equipment (such as a lubricant pump) constituting the lubrication system and pipes, potentially causing equipment malfunction or leakage of the lubricant. This problem is serious particularly when the wind turbine generator in an extremely cold environment is to be started.

To solve such a problem, a heater that heats lubricant is generally provided in a wind turbine generator disposed in a cold environment. At the starting of the wind turbine generator is started, a lubricant pump is actuated to start the lubrication system, after the lubricant is heated by the heater. For example, US Patent Application Publication No. US2009/0191060A1 discloses a technique for providing a heater in a drain pipe discharging lubricant from a speed-up gear to a lubricant pump, thereby avoiding damages of the lubricant pump.

According to study of the inventor of the present invention, however, the technique for supplying the heated lubricant is not always appropriate for a component, such as a main bearing, having a large heat capacity and a large contact area with the lubricant. The main bearing is cooled after the wind turbine generator stops operating. When the heated lubricant is supplied to the cooled main bearing, then the lubricant is instantly cooled to increase the viscosity of the lubricant, causing deterioration of the lubricant discharge efficiency. When lubricant of an amount exceeding the amount of lubricant dischargeable from the main bearing is supplied to the main bearing, leakage of the lubricant may occur.

To provide a heater heating the main bearing may be an approach for avoiding the above-stated problem; however, the approach of providing the heater heating the main bearing suffers from problems of a larger heat capacity of the main bearing of the wind turbine generator, and inevitable heat transmission to the nacelle base, which has a large heat capacity. To heat the main bearing to a necessary temperature using the heater, it is necessary to provide a heater having a considerably large heating capacity and a considerably long heating time is required. In these circumstances, it may be impractical to heat the main bearing using a heater. The above-described problem also applies to other rotating machines including a bearing with a large heat capacity (for example, shield machines, printing machines and industrial machines such as power generator turbines).

SUMMARY OF INVENTION

It is therefore an object of the present invention to provide a method of starting a rotating machine, such as a wind turbine generator, disposed in a cold environment, which method can deal with a problem of deterioration in lubricant discharge efficiency due to cooling of a main bearing.

In an aspect of a present invention, a starting method is provided for a rotating machine which includes a main shaft, a main bearing rotatably supporting the main shaft and a main bearing lubricant pump circulating lubricant through the main bearing. The starting method includes steps of: rotating the main shaft to raise a temperature of the main bearing in a state in which the main bearing lubricant pump is not operated; and operating the main bearing lubricant pump to start supplying the lubricant to the main bearing after the step of raising the temperature of the main bearing.

It is preferable that the number of rotations of the main shaft is controlled in the step of raising the temperature of the main bearing. It is also preferable that the main bearing is lubricated in an oil bath in rotating the main shaft to raise the temperature of the main bearing.

In one embodiment, the temperature of the main bearing is measured using a temperature sensor in the step of raising the temperature of the main bearing, and the main bearing lubricant pump is operated in response to the temperature of the main bearing measured by the temperature sensor.

In another aspect of the present invention, a starting method is provided for a rotating machine which includes a main shaft, a main bearing rotatably supporting the main shaft and a main bearing lubricant pump circulating lubricant through the main bearing, the starting method including steps of: rotating a main shaft and raising a temperature of a main bearing in a state in which lubricant is supplied to the main bearing at a first flow rate by using a main bearing lubricant pump; and supplying lubricant to the main bearing by using the main bearing lubricant pump at a second flow rate higher than the first flow rate.

In still another aspect of the present invention, a starting method is provided for a wind turbine generator which includes a main shaft connected to a wind turbine rotor, a main bearing rotatably supporting the main shaft and a main bearing lubricant pump circulating lubricant through the main bearing. The starting method includes: steps of: rotating the main shaft to raise a temperature of the main bearing in a state in which the main bearing lubricant pump is not operated; and operating the main bearing lubricant pump to start supplying the lubricant to the main bearing after the step of raising the temperature of the main bearing.

It is preferable that the number of rotations of the main shaft is controlled in the step of raising the temperature of the main bearing. The control of the number of rotations of the main shaft may be achieved by controlling a pitch angle of wind turbine blades of the wind turbine rotor or by controlling a generator torque of a generator driven by the main shaft.

It is preferable that the main bearing is lubricated in an oil bath in rotating the main shaft to raise the temperature of the main bearing.

In one embodiment, the temperature of the main bearing is measured using a temperature sensor in the step of raising the temperature of the main bearing, and the main bearing lubricant pump is operated in response to the temperature of the main bearing measured by the temperature sensor.

In the starting method of the wind turbine generator, generation of electric power is started after a supply of the lubricant to the main bearing is started.

In still another aspect of the present invention, a starting method of a wind turbine generator includes steps of: rotating a main shaft to raise a temperature of a main bearing in a state in which lubricant is supplied to the main bearing at a first flow rate by using a main bearing lubricant pump; and supplying lubricant to the main bearing by using the main bearing lubricant pump at a second flow rate higher than the first flow rate, after the step of raising the temperature of the main shaft.

The present invention provides a starting method for dealing with the problem of deterioration in lubricant discharge efficiency due to cooling of the main bearing for a rotating machine, especially, a wind turbine generator, disposed in the cold environment.

DESCRIPTION OF THE PREFERRED EMBODIMENTS

Figure 1:
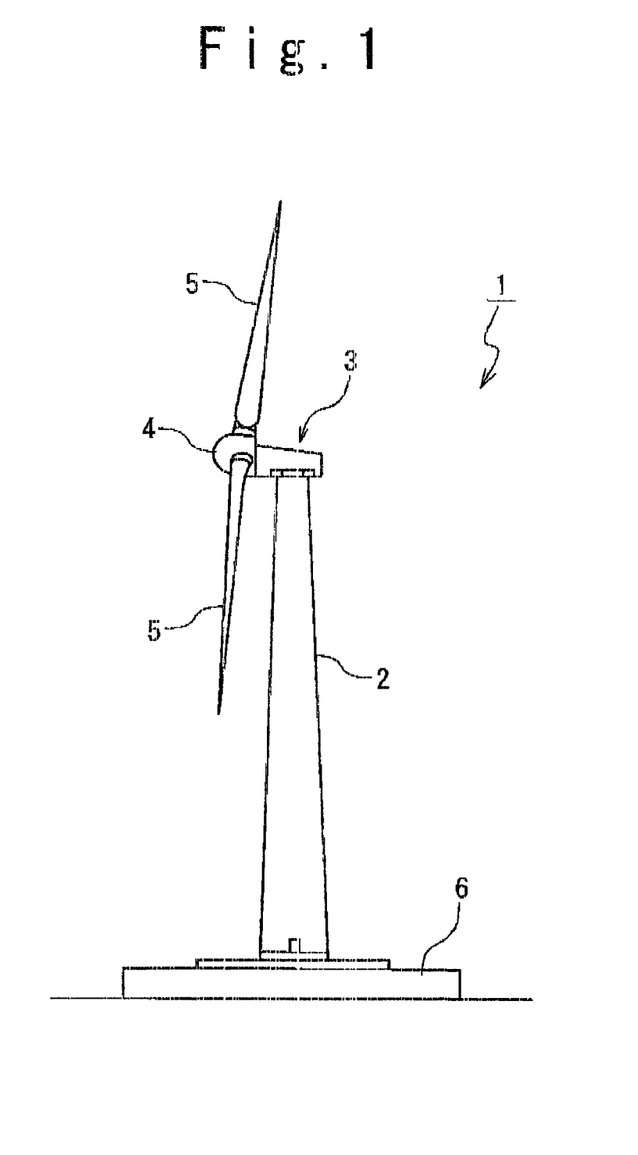
FIG. 1 is a side view showing the configuration of a wind turbine generator in one embodiment of the present invention of the present invention.

FIG. 1 is a side view showing a configuration of a wind turbine generator 1 in one embodiment of the present invention. The wind turbine generator 1 includes a tower 2 provided upright to a base 6, a nacelle 3 disposed on the top of the tower 2, a rotor head 4 provided rotatably to the nacelle 3, and wind turbine blades 5 attached to the rotor head 4. The rotor head 4 and the wind turbine blades 5 constitute a wind turbine rotor.

Figure 2:
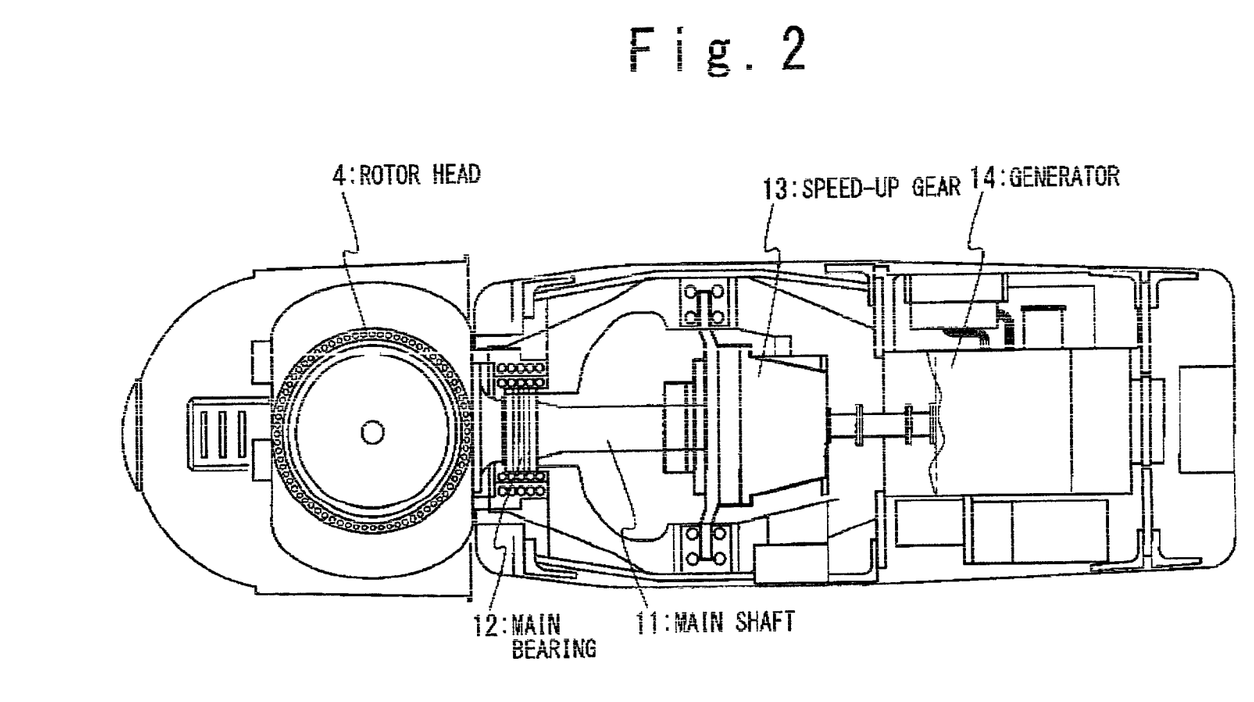
FIG. 2 is a top view showing the internal structure of a nacelle in one embodiment of the present invention.

As shown in FIG. 2, the rotor head 4 is connected to one end of a main shaft 11 which transmits power from the wind turbine rotor to a speed-up gear 13, and the main shaft 11 is rotatably supported by a main shaft bearing 12 which is a rolling bearing. The other end of the main shaft 11 is connected to the input shaft of the speed-up gear 13. The output shaft of the speed-up gear 13 is connected to the rotor of a generator 14. When the rotor head 4 rotates by wind force, the rotation is transmitted to the rotor of the generator 14 to drive the generator 14 with the rotation speed increased by the speed-up gear 13. As a result, electric power is obtained from the generator 14.

Figure 3:
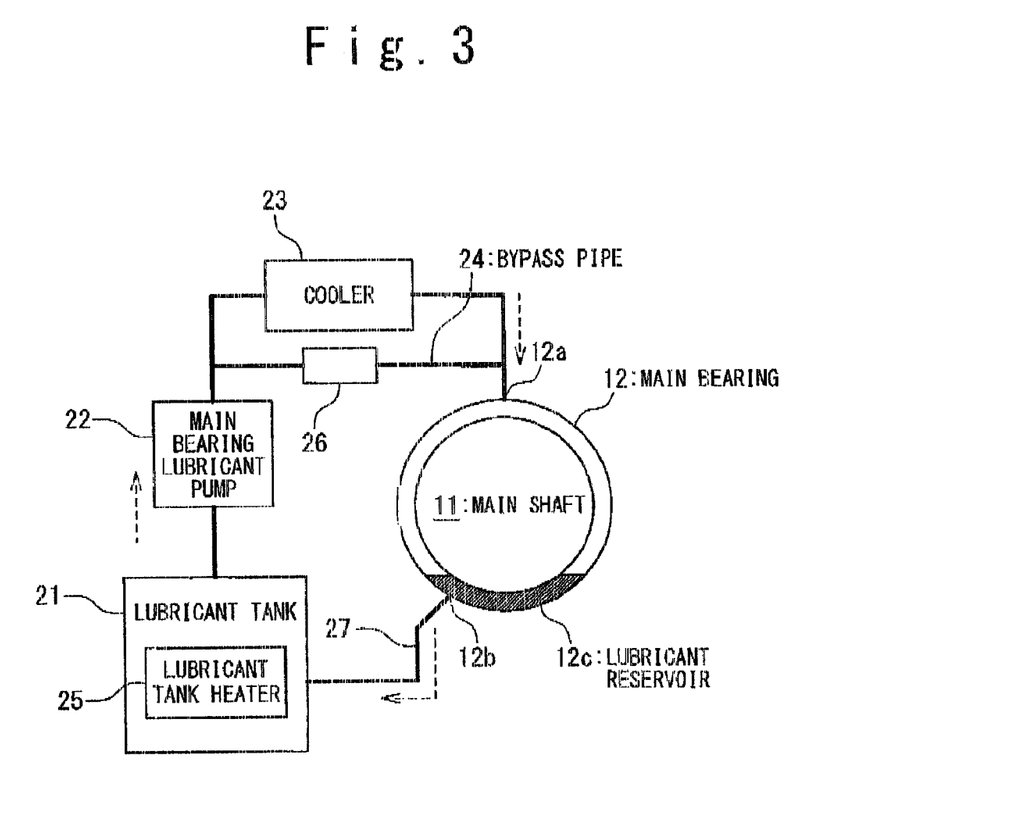
FIG. 3 is a conceptual diagram showing an example of the configuration of a lubricant circulating system supplying lubricant to a main bearing in one embodiment of the present invention.

FIG. 3 is a block diagram showing the configuration of a lubricant circulating system which supplies the lubricant to the main bearing 12. The lubricant circulating system in this embodiment includes a lubricant tank 21, a main bearing lubricant pump 22, a cooler 23, and a bypass pipe 24. The lubricant tank 21 is provided with a main bearing lubricant tank heater 25. As described later, the main bearing lubricant tank heater 25 is used to heat the lubricant in the lubricant tank 21. The main bearing lubricant pump 22 draws out the lubricant in the lubricant tank 21, and supplies the lubricant to the main bearing 12 via the cooler 23 or the bypass pipe 24. The cooler 23 cools the lubricant when the temperature of the lubricant is high. The outlet of the cooler 23 is connected to a lubricant inlet 12a of the main bearing 12. The bypass pipe 24 bypasses the lubricant when the temperature of the lubricant is not high. Provided for the bypass pipe 24 is a temperature actuation valve 26 which is opened when the temperature of the lubricant is lower than a predetermined temperature. The bypass pipe 24 bypasses the lubricant by the operation of the temperature actuation valve 26. Connected to a lubricant outlet 12b of the main bearing 12 is a drain pipe 27 which discharges the lubricant to the lubricant tank 21. When the main bearing lubricant pump 22 operates, then the lubricant is drawn out from the lubricant tank 21, supplied to the lubricant inlet 12a of the main bearing 12 via the cooler 23 or the bypass pipe 24, and returned to the lubricant tank 21 from the lubricant outlet 12b through the discharge pipe 27. It should be noted that the lubricant tank 21 and the main bearing lubricant tank heater 25 may be shared by a lubricant circulation system which circulates lubricant through an instrument other than the main bearing (for example, the speed-up gear 13).

In this embodiment, as shown in FIG. 3, the lubricant outlet 12b of the main bearing 12 is provided at a position away from the lowermost portion of the main bearing 12, and the main bearing 12 is configured to provide a lubricant reservoir 12c which accumulates the lubricant in the lower portion of the main bearing 12. That is, the main bearing 12 is configured to be lubricated by oil bath lubrication to some extent even when the main bearing lubricant pump 22 is not operated. As described later, such a structure of the main bearing 12 contributes to improvement in the procedure of starting the wind turbine generator 1.

Figure 4:
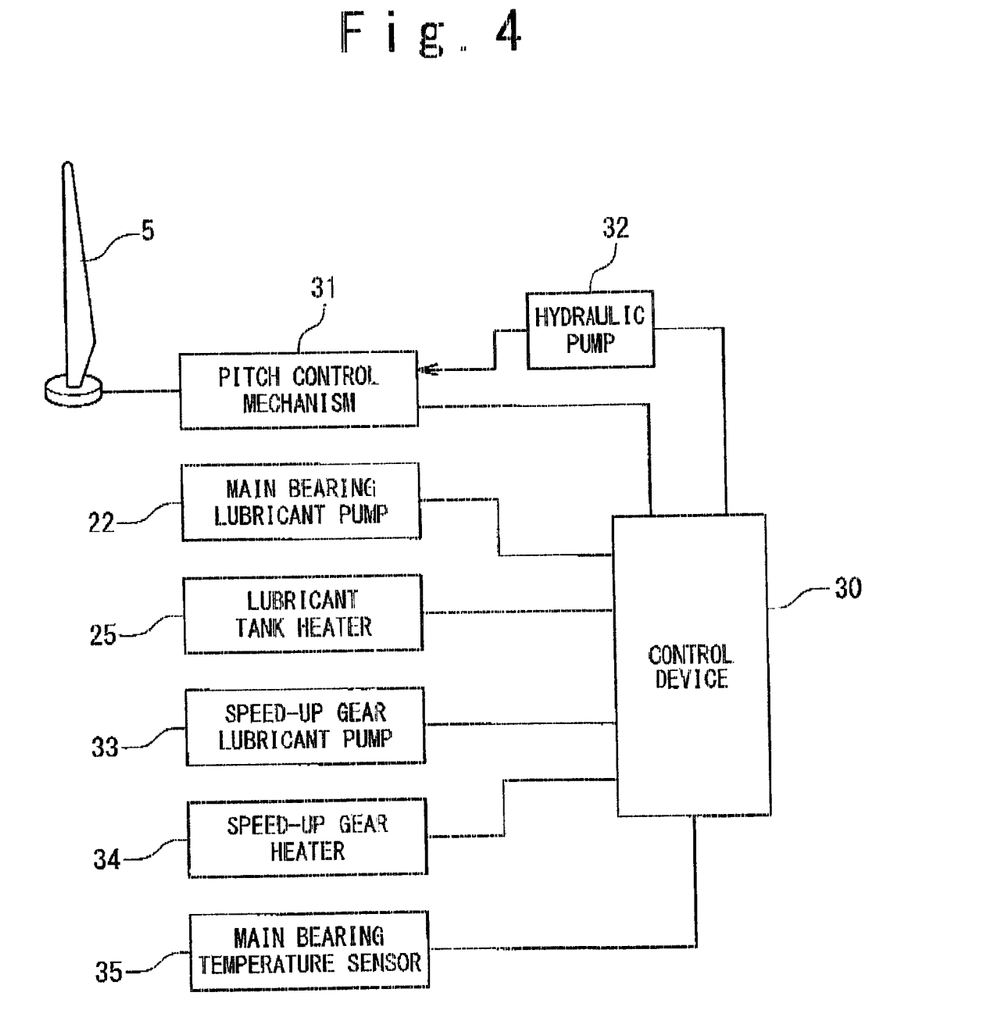
FIG. 4 is a block diagram showing a configuration of a control system of the wind turbine generator in one embodiment of the present invention.

FIG. 4 is a block diagram showing an example of the configuration of a control system of the wind turbine generator 1. Although FIG. 4 shows only portions related to the present invention among those within the control system of the wind turbine generator 1, the person skilled in the art would appreciate that various instruments are actually mounted in the wind turbine generator 1. In this embodiment, a control device 30 controls the main bearing lubricant pump 22, the main bearing lubricant tank heater 25, a pitch control mechanism 31, a hydraulic pump 32, a speed-up gear lubricant pump 33, and a speed-up gear heater 34. The pitch control mechanism 31 adjusts the pitch angle of the wind turbine blades 5 of the wind turbine rotor. The hydraulic pump 32 supplies hydraulic pressure to the pitch control mechanism 31. The control device 30 controls the pitch angle of the window turbine blades 5 using the pitch control mechanism 31. The speed-up gear lubricant pump 33 circulates the lubricant to the speed-up gear 13, and the speed-up gear heater 34 is provided in a lower portion of the speed-up gear 13 to heat the lubricant in the speed-up gear 13. The lubricant lubricating the speed-up gear 13 is heated by the speed-up gear heater 34.

Furthermore, a main bearing temperature sensor 35 is provided for the main bearing 12, and the control device 30 monitors the temperature of the main bearing 12 using the main bearing temperature sensor 35.

A description is next given of the outline of the procedures of starting the wind turbine generator 1 of this embodiment.

One of important respects in the procedure of starting the wind turbine generator 1 in this embodiment is to heat the main bearing 12 by using heat generation caused by actuation of the main bearing 12 per se. Heat is generated in the main bearing 12 not only by rotation loss of the inner ring and rolling elements but also by sliding of an oil seal (not shown) sealing the lubricant of the main bearing 12 on the main shaft 12. In this embodiment, the main shaft 11 is rotated at a low speed to generate heat in the main bearing 12 and to thereby heat the main bearing 12 in implementing a starting procedure of the wind turbine generator 1. By actuating the main bearing lubricant pump 22 after sufficiently raising the temperature of the main bearing 12, it is possible to solve the problem of the deterioration in lubricant discharge efficiency resulting from the cooling of the lubricant by the main bearing 12, which causes an increase in the viscosity of the lubricant.

In implementing the starting procedure described above, it is advantageous that the main bearing 12 is structured to accumulate the lubricant in the lower portion of the main bearing 12 to thereby allow oil bath lubrication to some extent, as described above. The oil bath lubrication avoids damaging the main bearing 12 due to the short of lubricant as long as the main shaft 12 rotates at a low speed. The inventor of the present invention has confirmed that an oil film can be formed by rotating the main shaft 11 at a low speed even at a low temperature of −40° C.

Figure 5:
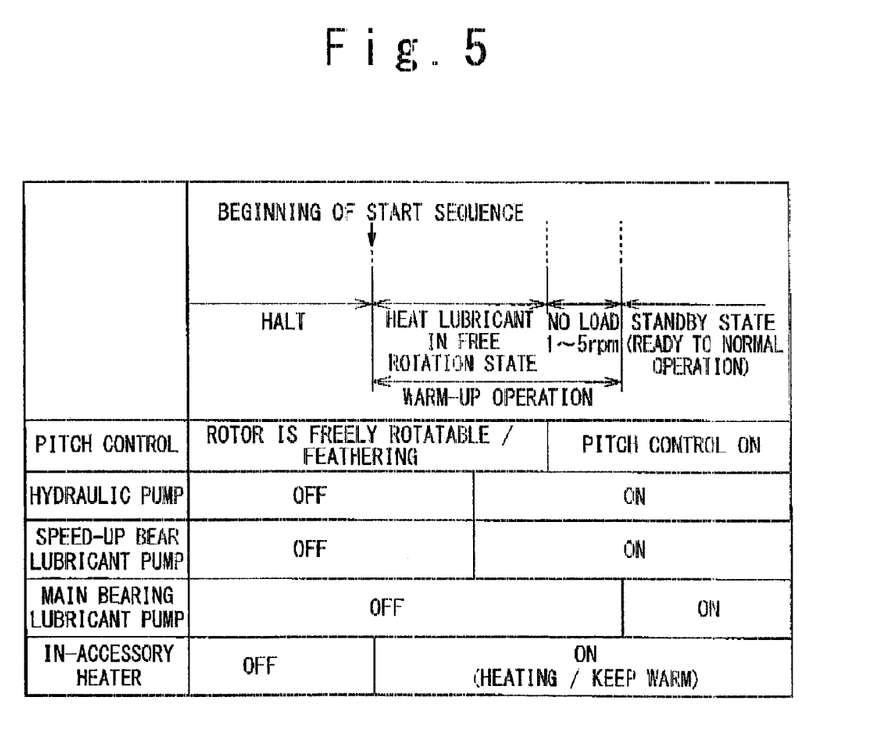
FIG. 5 is a table showing a procedure of starting the wind turbine generator in one embodiment of the present invention.

In the following, the procedure of starting the wind turbine generator 1 in this embodiment will be described in detail. FIG. 5 is a table showing an example of the procedure of starting the wind turbine generator 1. It is assumed that the wind turbine generator 1 is completely stopped in an extremely cold environment (of, for example, −40° C.) in an initial state. That is, it is assumed that the main bearing lubricant pump 22, the hydraulic pump 32, and the speed-up gear lubricant pump 33 are stopped and that supply of power to the main bearing lubricant tank heater 25 and the speed-up gear heater 34 is stopped. In such a state, the lubricant in the lubricant tank 21 is completely cooled and the temperature of the main bearing 12 is very low. In this case, the wind turbine 5 is set in a feather state (the state in which the angle of attack is minimum) and the wind turbine rotor is set in a freely rotatable state (the state in which the brake of the wind turbine rotor is released).

When the starting sequence is started by manually turning on an operation switch (not shown), for example, supply of power to the various heaters included in accessories starts. At the same time, supply of power to the main bearing lubricant tank heater 25 and the speed-up gear 34 also starts. The lubricants in the lubricant tank 21 and in the speed-up gear 13 thereby starts to be heated.

After the lubricants in the speed-up gear 13 and the hydraulic pump 32 are sufficiently heated, the hydraulic pump 32 and the speed-up gear lubricant pump 33 start operating. By actuating the hydraulic pump 32, the pitch control mechanism 31 is placed into a state in which the pitch control mechanism 31 can control the pitch of the wind turbine blades 5. At this time, the temperature of the lubricant is kept to a desired temperature (10° C., for example) using the main bearing lubricant tank heater 25 and the speed-up gear heater 34.

Next, the pitch angle of the wind turbine blades 5 is switched by the pitch control mechanism 31 from the feature state to the pitch angle at which the wind turbine blades 5 can slightly receive wind power energy, thereby starting rotation of the wind turbine rotor. The main shaft 11 rotates by rotation of the wind turbine rotor, and the temperature of the main bearing 12 rises by heat generation in the main bearing 12 per se. It should be noted that the main bearing lubricant pump 22 is not started when the wind turbine rotor starts rotating. As described above, the main bearing 12 is lubricated by the oil bath to some extent even when the main bearing lubricant pump 22 does not operate.

At this time, the number of rotations of the main shaft 11 is controlled not to be increased excessively (for example, 1-5 rpm). This aims to avoid a local and rapid increase of temperature, to reduce the risk of loss of control, including over speed, and to avoid the risk of damage of the main bearing 12. Specifically, the pitch control is implemented for the wind turbine blades 5, thereby controlling the number of rotations of the wind turbine rotor, that is, the number of rotations of the main shaft 11.

In one embodiment, the generator 14 is placed into a no-load state (that is, in a state in which a generator torque of the generator 14 is zero) while the wind turbine rotor rotates. However, the generator torque is not necessarily set to zero. Rather, the number of rotations of the main shaft 11 may be controlled by actively controlling the generator torque. In this case, the main shaft 11 and the wind turbine rotor may be rotated by causing the generator 14 to function as a motor. Also, both of the generator torque control and pitch angle control may be performed.

When the main bearing 12 is heated up to an appropriate temperature (10° C., for example), the main bearing lubricant pump 22 starts operating. The wind turbine generator 1 is thereby placed into a standby state in which the wind turbine generator 1 is ready to start generating power. In one embodiment, the timing of starting the main bearing lubricant pump 22 is decided in response to the temperature of the main bearing 22 measured by the main bearing temperature sensor 35. When the temperature of the main bearing 22 measured by the main bearing temperature sensor 35 exceeds a predetermined reference temperature, for example, the main bearing lubricant pump 22 starts operating. Alternatively, the main bearing lubricant pump 22 may start operating at the timing when a predetermined standby time elapses after the rotation of the wind turbine rotor is started. Even in this case, the main bearing lubricant pump 22 can start operating after the main bearing 12 is heated up to an appropriate temperature by appropriately setting the standby time.

Thereafter, the main bearing lubricant pump 22 starts operating and then the wind turbine generator 1 starts generating power.

The starting procedures stated above allows the main bearing 12 to be heated without providing a heater of a large capacity, avoiding the problem of the deterioration in the lubricant discharge efficiency for discharging the lubricant from the main bearing 12 at the time of starting the wind turbine generator 1 at a low temperature.

In the starting procedure stated above, the main bearing lubricant pump 22 may be operated at a small number of rotations to supply the lubricant of a small amount to the main bearing 12 instead of stopping the main bearing lubricant pump 22 until the main bearing 12 is heated. In this case, there is no need to use the main bearing 12 that is structured to accumulate the lubricant in the lower portion of the main bearing 12 to be lubricated by the oil bath (it should be noted that a main bearing 12 structured to accumulate lubricant at the lower portion may be used). The flow rate of the lubricant supplied to the main bearing 12 before the completion of the heating of the main bearing 12 is adjusted to be lower than the flow rate of the lubricant supplied to the main bearing 12 after the wind turbine generator 1 is placed into the standby state (that is, the flow rate of the lubricant after the wind turbine generator 1 starts power generation operation), and adjusted to be low to avoid a leakage of the lubricant and a damage of the main bearing lubricant pump 22.

Also, the present invention may be applied to other rotating machines in which a main bearing that rotatably supports a main shaft has a large heat capacitance, although embodiments are described in which the present invention is applied to a wind turbine generator. For example, it is preferable that the present invention is applied to shield machines, printing machines and industrial machines such as power generator turbines.

What is claimed is:

1. A starting method of a wind turbine generator which includes a main shaft connected to a wind turbine rotor, a main bearing rotatably supporting said main shaft and a main bearing lubricant pump circulating lubricant through said main bearing, said method comprising:

rotating said main shaft and raising a temperature of said main bearing in a state in which said main bearing lubricant pump is not operated, wherein a rotational velocity of said main shaft is controlled in a state in which a generator connected to said main shaft is placed into a no-load state in the raising of the temperature of said main bearing; and operating said main bearing lubricant pump to start supplying the lubricant to said main bearing after the raising of the temperature of said main bearing, wherein the no-load state is a state in which a generator torque of the generator is zero and a rotor of the generator remains connected to the main shaft.

2. The starting method according to claim 1, wherein the control of the rotational velocity of said main shaft is achieved by controlling a pitch angle of wind turbine blades of said wind turbine rotor.

3. The starting method according to claim 1, wherein said main bearing is lubricated in an oil bath in rotating said main shaft to raise the temperature of said main bearing.

4. The starting method according to claim 1, wherein the temperature of said main bearing is measured with a temperature sensor in the step of raising the temperature of said main bearing, and wherein said main bearing lubricant pump is operated in response to the temperature of said main bearing measured by said temperature sensor.

5. The starting method according to claim 1, wherein generation of electric power is started after a supply of the lubricant to said main bearing is started.

6. The starting method according to claim 1, wherein the operating of said main bearing lubricant pump to start supplying the lubricant to said main bearing starts when a predetermined standby time elapses after the rotating of the main shaft.

7. The starting method according to claim 1, further comprising supplying power to warm a main bearing lubricant tank heater and a speed-up gear, and heating a lubricant tank, a speed-up gear, and a hydraulic pump.

8. The starting method according to claim 7, further comprising operating the hydraulic pump to control a pitch of wind turbine blades.

9. The starting method according to claim 8, further comprising adjusting a pitch angle of the wind turbine bladed by a pitch control mechanism from a feather state to a pitch angle at which the wind turbine blades receive wind power energy thereby starting rotation of the wind turbine rotor.

10. The starting method according to claim 9, further comprising operating the main bearing lubricant pump when the main bearing is heated to a predetermined temperature thereby placing the wind turbine generator into a standby state in which the wind turbine generator is ready to generate electric power.

11. A starting method of a wind turbine generator which includes a main shaft connected to a wind turbine rotor, a main bearing rotatably supporting said main shaft and a main bearing lubricant pump circulating lubricant through said main bearing, said method comprising steps of:

rotating a main shaft and raising a temperature of a main bearing in a state in which lubricant is supplied to the main bearing at a first flow rate with a main bearing lubricant pump, wherein a rotational velocity of said main shaft is controlled in a state in which a generator connected to said main shaft is placed into a no-load state in the raising of the temperature of said main bearing; and supplying lubricant to said main bearing with said main bearing lubricant pump at a second flow rate higher than said first flow rate, wherein the no-load state is a state in which a generator torque of the generator is zero and a rotor of the generator remains connected to the main shaft.

* * * * *